United States Patent
Arao et al.

(10) Patent No.: US 9,256,040 B2
(45) Date of Patent: Feb. 9, 2016

(54) OPTICAL CABLE TERMINAL FIXTURE, TERMINAL FIXING STRUCTURE OF OPTICAL CABLE, AND OPTICAL MODULE

(71) Applicant: SUMITOMO ELECTRIC INDUSTRIES, LTD., Osaka-shi, Osaka (JP)

(72) Inventors: Hajime Arao, Yokohama (JP); Toshihisa Yokochi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/368,617

(22) PCT Filed: Nov. 27, 2012

(86) PCT No.: PCT/JP2012/080641
§ 371 (c)(1),
(2) Date: Jun. 25, 2014

(87) PCT Pub. No.: WO2013/099496
PCT Pub. Date: Jul. 4, 2013

(65) Prior Publication Data
US 2014/0348476 A1    Nov. 27, 2014

(30) Foreign Application Priority Data

Dec. 28, 2011 (JP) .................................. 2011-287081
Sep. 7, 2012 (JP) .................................. 2012-197710

(51) Int. Cl.
*G02B 6/44* (2006.01)
(52) U.S. Cl.
CPC ............ *G02B 6/4434* (2013.01); *G02B 6/4403* (2013.01); *G02B 6/4477* (2013.01)

(58) Field of Classification Search
CPC .............. G02B 6/46; G02B 6/44; G02B 6/42; G02B 6/36; G02B 6/00; G02B 6/4403; G02B 6/4434; G02B 6/4269; G02B 6/3616; G02B 6/4471; G02B 6/4442; G02B 6/4475; G02B 6/4495
USPC ............. 385/103, 147, 136, 113, 55, 99, 105, 385/134, 135, 95; 439/601, 397, 399, 543
See application file for complete search history.

(56) References Cited

U.S. PATENT DOCUMENTS

| 5,530,785 A | * | 6/1996 | Sakamoto et al. | ............ 385/136 |
| 2010/0092147 A1 | * | 4/2010 | Desard et al. | ............ 385/135 |

FOREIGN PATENT DOCUMENTS

| JP | S56-125707 A | 10/1981 | |
| JP | H03-24607 U | * 3/1991 | ............ G02B 6/36 |
| JP | 2004-177613 A | 6/2004 | |

(Continued)

*Primary Examiner* — Ellen Kim
(74) *Attorney, Agent, or Firm* — Drinker Biddle & Reath LLP

(57) ABSTRACT

An optical cable terminal fixture of the invention capable of increasing a fixing force of an optical cable and also simplifying swage operation, a terminal fixing structure of the optical cable, and an optical module. An optical cable terminal fixture includes a body having an outer sheath fixing part for fixing an outer sheath and a cable insertion path into which optical fibers are inserted, and a wind part having a wind claw on a lateral portion of the body around which a tensile strength wire is wound. Accordingly, by swaging the wind claw on which the tensile strength wire is wound to the outer sheath fixing part, a tensile force applied to an optical cable can be distributed to become resistant to tension.

12 Claims, 13 Drawing Sheets

(56) References Cited

FOREIGN PATENT DOCUMENTS

| JP | 2005-134712 | A | 5/2005 |
| JP | 2007-019411 | A | 1/2007 |
| JP | 3988655 | B2 | 10/2007 |
| JP | 2011-112898 | A | 6/2011 |

* cited by examiner (A − A)

OPTICAL CABLE TERMINAL FIXTURE, TERMINAL FIXING STRUCTURE OF OPTICAL CABLE, AND OPTICAL MODULE

BACKGROUND

The present invention relates to an optical cable terminal fixture, a terminal fixing structure of an optical cable, and an optical module.

A conventional optical module includes a circuit substrate on which a photoelectric converter connected to an optical fiber of an optical cable is mounted, and a metallic housing for receiving the circuit substrate. This optical module converts inputted and outputted electrical signals into optical signals by the photoelectric converter, and transmits signals by the optical signals.

The known optical cable used in this optical module is a metal pipe type optical cable in which an outer periphery of a single-core or multi-core optical fiber is covered with a metal pipe and a tensile strength fiber for increasing the tensile strength of the optical cable is longitudinally attached to an outer periphery of the metal pipe and an outer periphery of the tensile strength fiber is further covered with an outer sheath (for example, see Patent Document 1).

In a terminal fixing structure of this optical cable, the outer sheath of the end of the optical cable is removed and the metal pipe and the tensile strength fiber are exposed. Two cylindrical metal sleeves are fitted into the outer periphery of the metal pipe and the tensile strength fiber exposed. Then, after the first metal sleeve of the terminal side of the optical cable is swaged, the tensile strength fiber is folded. Thereafter, the top of the folded tensile strength fiber is inserted into the inside of the second metal sleeve fitted previously and the second metal sleeve is swaged to thereby fix the tensile strength fiber to the outer periphery of the metal pipe.

Patent Document 1: Japanese Patent No. 3988655

However, since the terminal fixing structure of the optical cable described above uses the plural metal sleeves, the number of swaged places is more than one, so that swage operation is complicated.

Since the outer sheath of the optical cable cannot be swaged, a fixing force of the optical cable to a strong tensile force on the optical cable may run short.

An object of the invention is to provide an optical cable terminal fixture capable of increasing a fixing force of an optical cable and also simplifying swage operation, a terminal fixing structure of the optical cable, and an optical module.

SUMMARY

An optical cable terminal fixture according to the invention capable of solving the problems described above is an optical cable terminal fixture for fixing a terminal of an optical cable having a tensile strength fiber around an optical fiber and having an outer sheath on an outer periphery of the tensile strength fiber comprises a body having an outer sheath fixing part for fixing the outer sheath, and a cable insertion path into which the optical fiber is inserted, and a lateral part having a wind part on a lateral portion of the body around which the tensile strength fiber is wound.

In the optical cable terminal fixture according to the invention, preferably, the lateral part can be folded toward the body, and the lateral part includes an outer sheath pressing part for fixing a part of the outer sheath between the outer sheath fixing part and the outer sheath pressing part, and a step pressing part for fixing the outer sheath by pressing the outer sheath to a center direction of the optical cable so as to form a step part on the outer sheath.

In the optical cable terminal fixture according to the invention, preferably, a claw projecting in a direction that the lateral part is folded is formed on the step pressing part so as to form the step part.

In the optical cable terminal fixture according to the invention, preferably, the outer sheath pressing part is provided with a pressing protrusion in a direction that the lateral part is folded.

In the optical cable terminal fixture according to the invention, preferably, the lateral part can be folded toward the body, and the lateral part includes a pressing part for pressing the tensile strength fiber wound on the wind part to the outer sheath fixing part.

In the optical cable terminal fixture according to the invention, preferably, the pressing part is provided with a pressing protrusion in a direction that the lateral part is folded.

In the optical cable terminal fixture according to the invention, preferably, the wind parts are formed on both sides of the body.

In the optical cable terminal fixture according to the invention, preferably, the wind part has plural claws, and the claws are formed to be foldable toward the body.

In the optical cable terminal fixture according to the invention, preferably, the claws are formed in positions symmetrical with respect to a central axis of the cable insertion path.

An optical cable terminal fixing structure according to the invention capable of solving the problems described above is the optical cable comprises an optical cable including an optical fiber, a tensile strength fiber around the optical fiber, and an outer sheath on an outer periphery of the tensile strength fiber, a body having an outer sheath fixing part for fixing the outer sheath and a cable insertion path into which the optical fiber is inserted, and a lateral part having a wind part on a lateral portion of the body around which the tensile strength fiber is wound, and wherein the tensile strength fiber is inserted into the cable insertion path together with the optical fiber and is wound around the wind part, and wherein the lateral part is folded toward the body.

In the optical cable terminal fixing structure according to the invention, preferably, the lateral part comprises an outer sheath pressing part for fixing a part of the outer sheath between the outer sheath fixing part and the outer sheath pressing part, and a step pressing part for fixing the outer sheath by pressing the outer sheath to a center direction of the optical cable so as to form a step part on the outer sheath.

In the optical cable terminal fixing structure according to the invention, preferably, the outer sheath is pressed in plural places.

In the optical cable terminal fixing structure according to the invention, preferably, the lateral part further comprises plural claws formed in positions symmetrical with respect to a central axis of the cable insertion path, and the tensile strength fiber is wound on the plural claws formed in positions symmetrical with respect to a central axis of the cable insertion path.

In the optical cable terminal fixing structure according to the invention, preferably, the lateral part further comprises plural claws formed in positions symmetrical with respect to a central axis of the cable insertion path, and the tensile strength fiber is bundled and is sequentially wound on the plural claws.

An optical module according to the invention capable of solving the problems described above is an optical module comprises an optical cable including an optical fiber, a tensile strength fiber around the optical fiber, and an outer sheath on an outer periphery of the tensile strength fiber, a circuit substrate on which a photoelectric converter is mounted and the optical fiber is connected to the photoelectric converter, a housing for receiving the circuit substrate, and an optical cable terminal fixture including a body having an outer sheath fixing part for fixing the outer sheath and a cable insertion path into which the optical fiber is inserted, and a lateral part having a wind part on a lateral portion of the body around a lateral portion of the body which the tensile strength fiber is wound, a terminal of the optical cable is fixed to one end of the housing, and wherein the tensile strength fiber is inserted into the cable insertion path together with the optical fiber and is wound around the wind part.

In the optical module according to the invention, preferably, the lateral part is folded toward the body, and an outer sheath pressing part formed on the lateral part fixes a part of the outer sheath between the outer sheath fixing part and the outer sheath pressing part, and a step pressing part formed on the lateral part fixes the outer sheath by pressing the outer sheath to a center direction of the optical cable so as to form a step part on the outer sheath, and the optical cable includes a metal layer between the tensile strength fiber and the outer sheath, and the metal layer is interposed between the outer sheath fixing part and the outer sheath and is pressed to the outer sheath fixing part by the lateral part.

According to the optical cable terminal fixture, the terminal fixing structure of the optical cable and the optical module according to the invention, a fixing force of the optical cable can be increased and also swage operation can be simplified.

DETAILED DESCRIPTION

One preferred embodiment of an optical cable terminal fixture, a terminal fixing structure of an optical cable and an optical module according to the invention will hereinafter be described with reference to the drawings.

First Embodiment

An optical module is used for transmitting a signal (data) in optical communication technology etc. The optical module is electrically connected to an electronic device such as a personal computer of a connection destination and converts inputted and outputted electrical signals into optical signals and transmits the optical signals.

Figure 1:
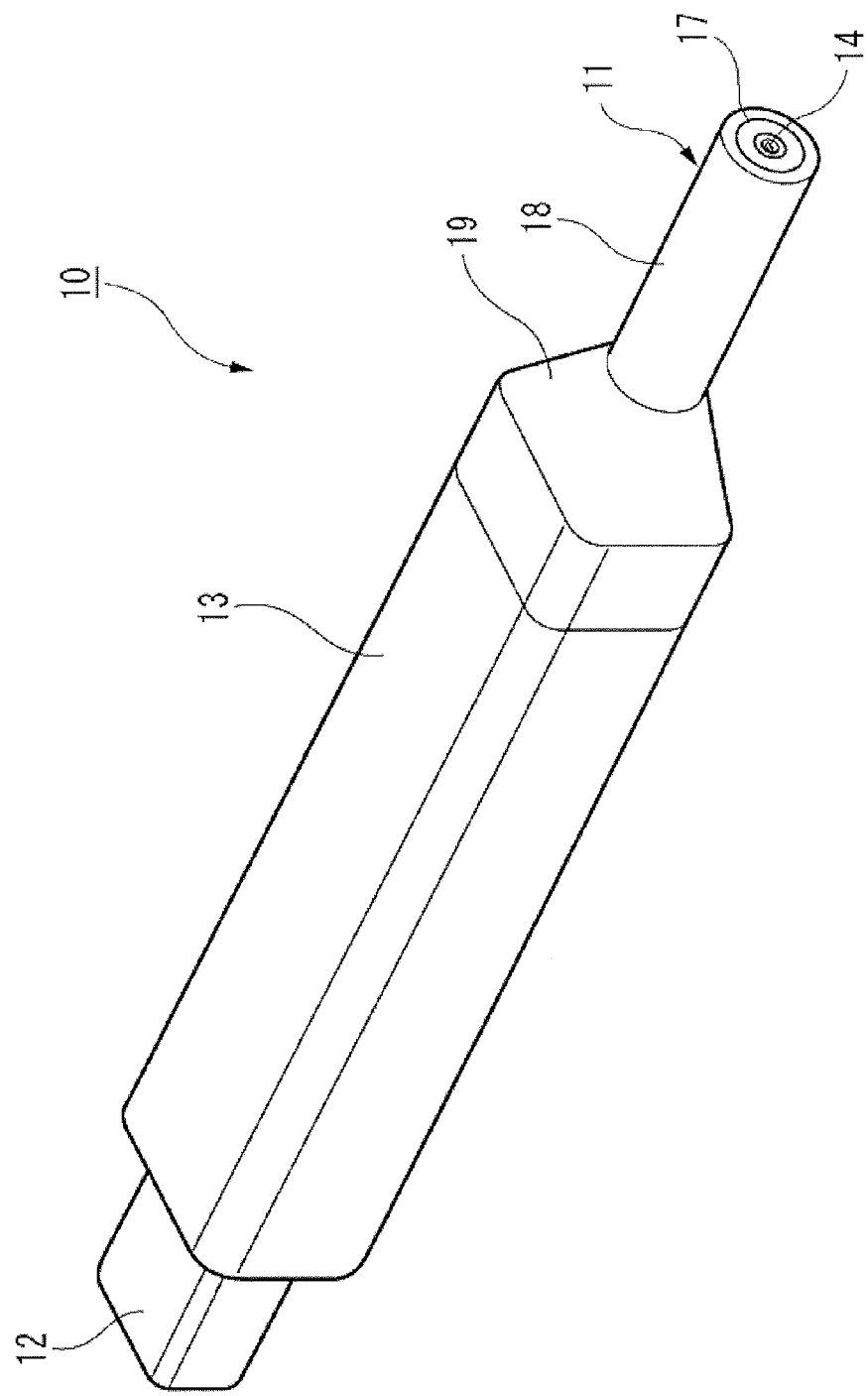
FIG. 1 is a perspective view showing one embodiment of an optical module according to the invention.

As shown in FIG. 1, in an optical module 10 of the present embodiment, a connector module is connected to the end of an optical cable 11. This optical cable includes an electrical connector 12 formed on the terminal side, and an exterior housing 13 for covering a metallic housing 20 (see FIG. 3) for receiving a circuit substrate 22. The portion of connection between the optical cable 11 and the housing 20 is covered with a boot 19.

Figure 2:
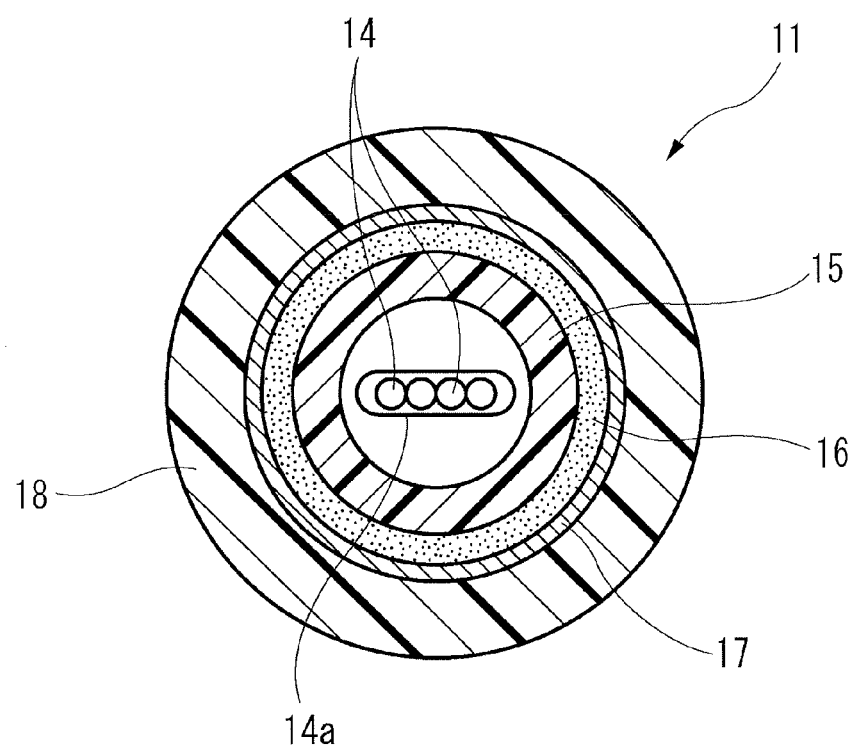
FIG. 2 is a sectional view of an optical cable of FIG. 1.

As shown in FIG. 2, the optical cable 11 has an optical fiber tape 14a in the center viewed in a transverse cross section of the optical cable 11. The optical fiber tape 14a is a core wire includes plural (four in the present example) optical fibers 14 that are arranged to be in parallel on a plane and are integrated in a tape shape by a coated resin. The optical fiber tape 14a is received inside an inner tube 15. The periphery of the inner tube 15 is provided with an interposed layer made by attaching a tensile strength wire 16 which is a bundle of tensile strength fibers. The outer periphery of this interposed layer is provided with a metal layer 17 made of plural metal strands. The outer periphery of the metal layer 17 is provided with an outer sheath 18 made of an insulating resin.

As the optical fiber 14, an optical fiber in which a core and cladding are made of quartz glass (AGF: All Glass Fiber), an optical fiber in which cladding is made of hard plastic (HPCF: Hard Plastic Clad Fiber), etc. can be used. In the case of using the HPCF with a small diameter in which a core diameter of glass is 80 μm, the HPCF is resistant to fracture even when the optical fiber 14 is bent in a small diameter. The plural optical fibers 14 can also be received inside the inner tube 15 in a state of a single core without being formed in the tape shape, but in the case of being formed in the tape shape, occurrence of micro-bending loss caused by applying a lateral pressure due to intersection between the single-core optical fibers 14 can be prevented. In addition, the plural optical fiber tapes 14a may be formed.

The inner tube 15 is made of an insulating resin such as PVC (polyvinyl chloride) which is a halogen-free flame-retardant resin. The inner tube 15 has, for example, 2.0 mm in outside diameter and 0.55 mm in thickness. The tensile strength wire 16 of the interposed layer is, for example, an ultrathin-diameter aramid fiber, and is built into the optical cable 11 in a state gathered in a bundle shape. The interposed layer has a tensile strength function in the optical cable 11.

The metal layer 17 is formed by braiding, for example, plural tin-plated conductive wires, and has a function as a heat-radiating layer. A braid density of the metal layer 17 is 70% or more, and a knitting angle is 45° to 60°. An outside diameter of the metal strand constructing the metal layer 17 is about 0.05 mm. Thermal conductivity of the metal layer 17 is, for example, 400 W/m·K. The metal layer 17 is preferably arranged in a high density in order to well ensure thermal conduction, and is preferably constructed of a tin-plated conductive wire of a rectangular wire by way of example. The outer sheath 18 is formed of an insulating resin such as polyolefin. The outer sheath 18 has, for example, 4.2 mm in outside diameter and 0.5 mm in thickness. The optical cable 11 with such a configuration is excellent in lateral pressure characteristics of the optical fiber 14, flexibility as the cable and further heat-radiating properties.

Figure 3:
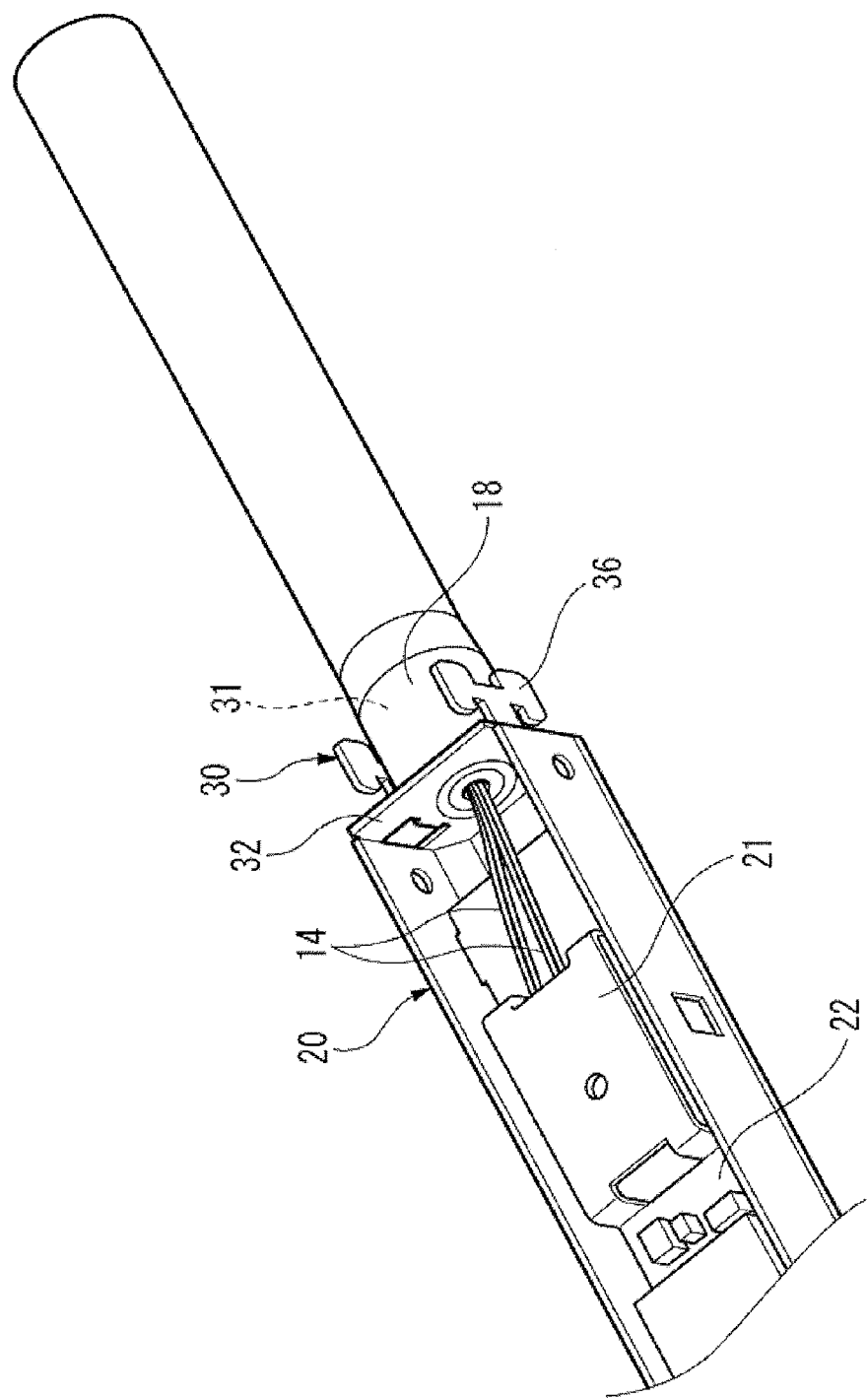
FIG. 3 is a perspective view showing the inside of a housing of the optical module of FIG. 1.

As shown in FIG. 3, the housing 20 is a tubular receiving member whose cross section shows substantially a rectangular shape, and defines receiving space for receiving the circuit substrate 22 etc. equipped with a photoelectric converter 21 to which the optical fiber 14 is connected. Also, the front end of the housing 20 is provided with the electrical connector 12, and an optical cable terminal fixture 30 for fixing the optical cable 11 is joined to the back end of the housing 20. The housing 20 is formed of a metal material with high thermal conductivity (preferably, 100 W/m·K or more), for example, steel (Fe series), tin (tin-plated copper), stainless steel, copper, brass or aluminum.

Figure 4:
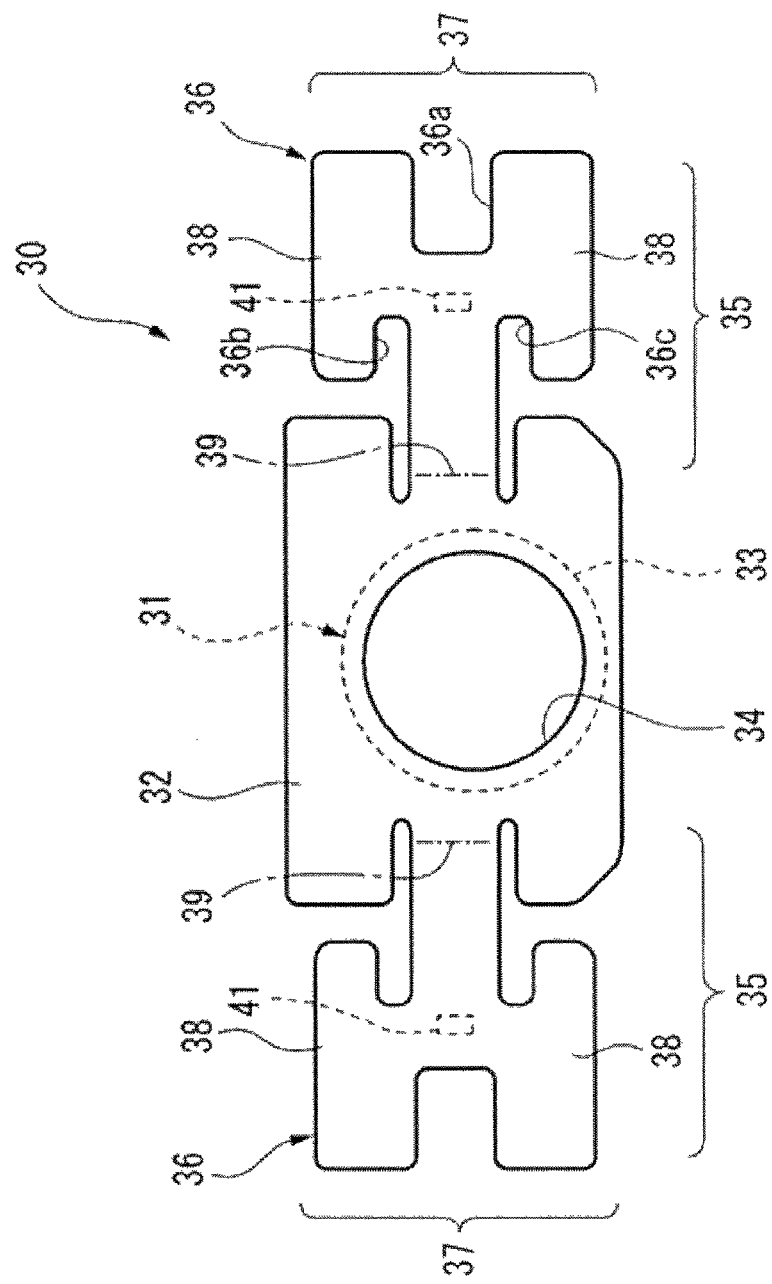
FIG. 4 is a plan view showing one embodiment of an optical cable terminal fixture according to the invention.

As shown in FIG. 4, in the optical cable terminal fixture 30 of the present embodiment, a body 31, a basal part 32 and lateral parts 35 are integrally formed. The body 31 has a cylindrical shape having an outer sheath fixing part 33 for fixing the outer sheath 18 and a cable insertion path 34 into which the optical fibers 14 are inserted (the body 31 is extended to the back side of the paper plane in the drawing, and also see FIGS. 3 and 5). The basal part 32 has a flat plate shape arranged in the front end of the body 31. That is, the body 31 is formed so as to backward project from the basal part 32.

The lateral parts 35 have wind parts 36 on which the tensile strength wires 16 obtained by bundling tensile strength fibers of the optical cable 11 in plural pieces are wound in both lateral portions of the basal part 32. That is, the wind parts 36 are formed on both sides of the body 31 with the body 31 sandwiched. Accordingly, a tensile force applied to the optical cable 11 can be distributed. In addition, the lateral parts 35 have a bilateral symmetrical configuration, and its explanation will be offered by only one of the lateral parts.

The lateral part 35 combines a pressing part 37 having a pressing function together with the wind part 36. The pressing part 37 presses the tensile strength wire 16 together with the metal layer 17 and the outer sheath 18 to an outer peripheral surface of the outer sheath fixing part 33. That is, the lateral part 35 includes the pressing part 37 for pressing the tensile strength wire 16 wound on the wind part 36 to the outer sheath fixing part 33. The wind part 36 and the pressing part 37 are joined to the basal part 32 through a folding part 39. The folding part 39 is a folded portion for substantially horizontally folding the wind part 36 and the pressing part 37 to the side of the body 31. In addition, the pressing part 37 may be provided with a pressing protrusion 41 in a direction that the lateral part 35 is folded in order to more increase the strength of pressing the tensile strength wire 16 together with the metal layer 17 and the outer sheath 18 to the outer peripheral surface of the outer sheath fixing part 33. Since such a pressing protrusion 41 bites into the outer sheath 18 etc. at the time of pressing, the outer sheath 18 etc. can be fixed more strongly. Such a pressing protrusion 41 may be formed by partially folding a part of the wind part 36 in the direction that the lateral part 35 is folded.

The wind part 36 has plural (a pair of vertical claws extended in a transverse direction in the present embodiment) claws 38, and three wind recesses 36a, 36b, 36c adjacent to the claws 38. That is, the claws 38 are formed in a position bilaterally symmetrical with respect to the central axis of the cable insertion path 34, and can be folded toward the body 31. The tensile strength wires 16 exposed from the optical cable 11 and bundled in plural pieces are wound on the claws 38. Accordingly, the tensile force applied to the optical cable 11 can be distributed more efficiently.

In addition, a configuration of the wind part 36 is not limited to the configuration described above, and the claws 38 extended in the transverse direction may be formed in one rectangular shape or in three or more lines in a vertical direction. In addition, it is unnecessary for the lateral parts 35 to have the bilateral symmetrical configuration, and the configuration or the number of claws 38 may differ in the right and left.

Next, one example of a procedure for winding the tensile strength wire 16 of the optical cable 11 on the wind parts 36 of the optical cable terminal fixture 30 will be described.

Figure 5:
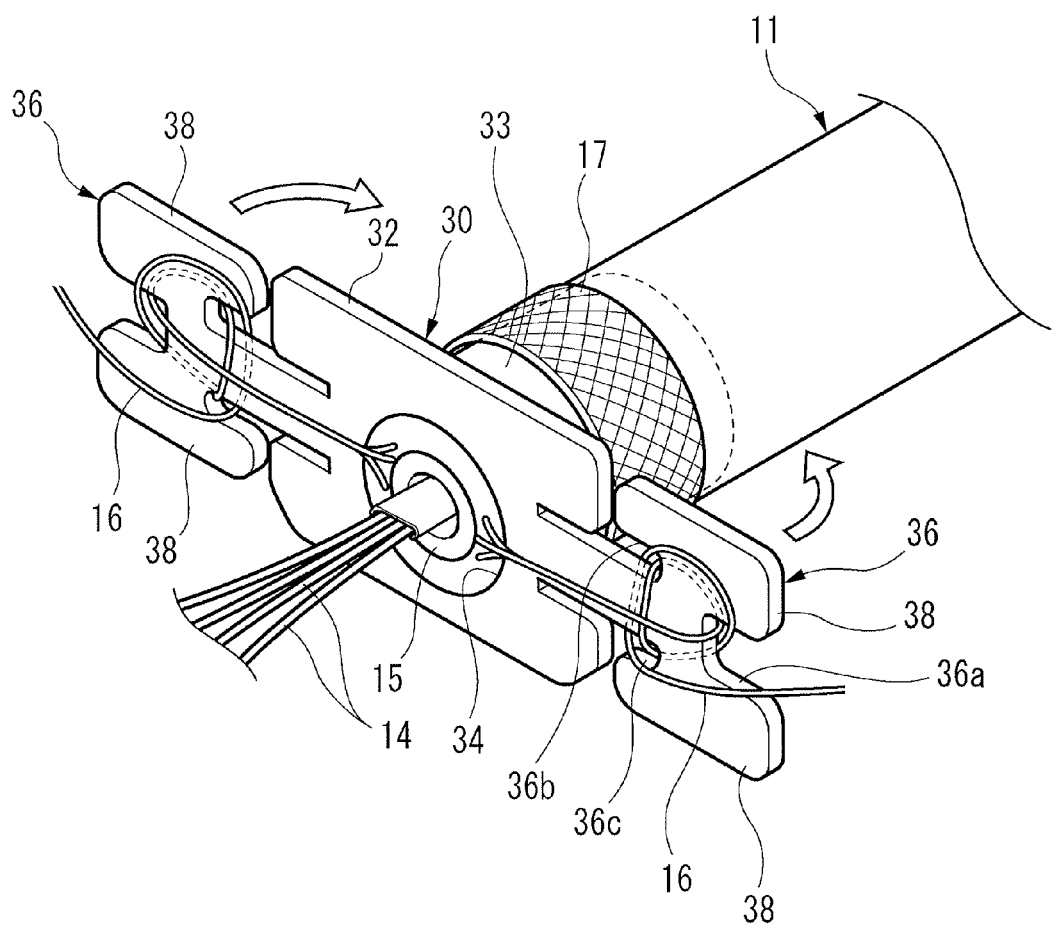
FIG. 5 is a perspective view showing a state of attaching the optical cable terminal fixture of FIG. 4.

As shown in FIG. 5, the metal layer 17 exposed by peeling the outer sheath 18 of the optical cable 11 is folded to the outer peripheral side of the outer sheath 18. Next, the optical fibers 14, the inner tube 15 and the tensile strength wire 16 of the optical cable 11 are inserted into the cable insertion path 34 of the body 31 and also, the outer periphery of the outer sheath fixing part 33 is covered with the metal layer 17 and the outer sheath 18. Then, the tensile strength wire 16 inserted into the cable insertion path 34 is pulled out of the front side of the basal part 32 along the side of the wind part 36.

Then, the tensile strength wire 16 is inserted from the front side of the wind part 36 into the first wind recess 36a formed between the claws 38, and is inserted from the back side of the wind part 36 into the second wind recess 36b, and is inserted from the front side of the wind part 36 into the third lower wind recess 36c. Then, the tensile strength wire 16 is again inserted from the back side of the wind part 36 into the first wind recess 36a, and is again inserted from the front side of the wind part 36 into the second wind recess 36b, and is again inserted from the back side of the wind part 36 into the third wind recess 36c. In this manner, the tensile strength wire 16 is wound on the wind recesses 36a, 36b, 36c of the claws 38 branched in plural places of the wind part 36 plural times to thereby be strongly wound without coming loose.

In addition, winding work by hand can be done more efficiently by slightly folding the wind part 36 in a direction (direction of arrow in the drawing) of the outer sheath fixing part 33 before winding. Also, the winding structure described herein is one example, and various winding structures are further considered, and the winding structure is not limited to the specific winding structure as long as the tensile strength wire can be wound easily and efficiently.

In addition, one example of branching the tensile strength wire 16 in two places of both of the wind parts 36 is described, but the example is not limited to this example, and, for example, a winding structure of sequentially winding the tensile strength wire bundled in one piece on the plural claws 38 formed in positions symmetrical with respect to the central axis of the cable insertion path 34 may be used.

Next, one example of a procedure for swaging the optical cable terminal fixture 30 in which the tensile strength wires 16 are wound on the wind parts 36 will be described.

Figure 6:
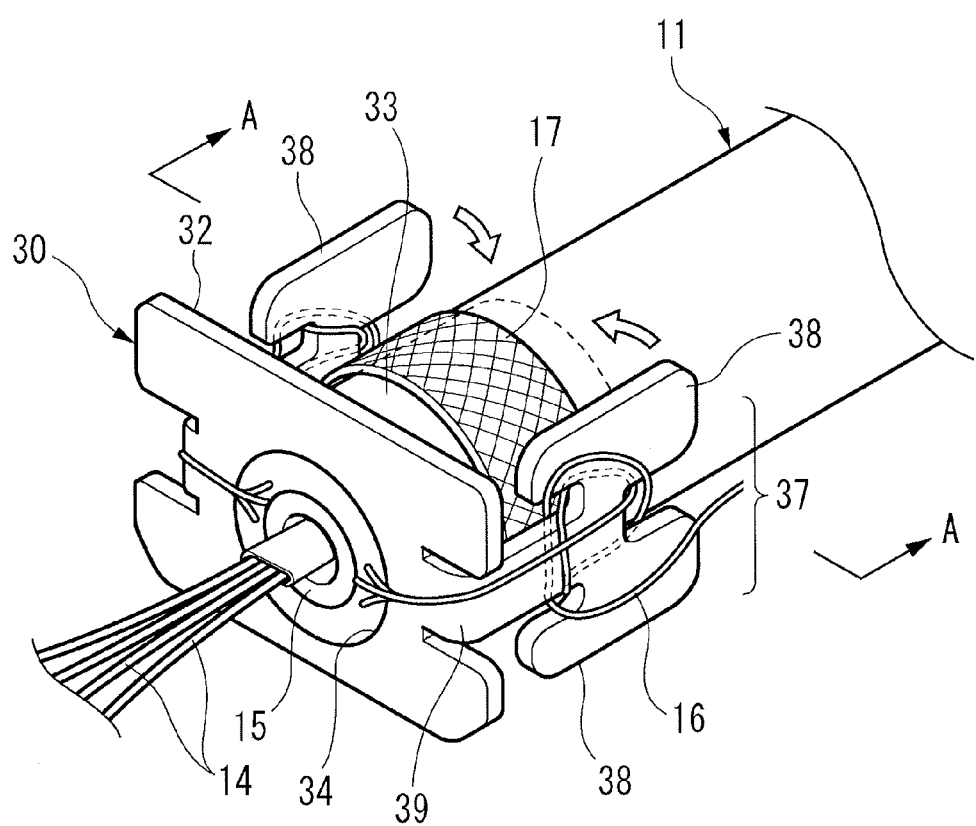
FIG. 6 is a perspective view showing a state of swaging the optical cable terminal fixture of FIG. 5.

As shown in FIG. 6, the pressing part 37 on which the tensile strength wire 16 is wound is substantially perpendicularly folded from the folding part 39 to the side of the outer sheath fixing part 33 and also, is pressed to an upper surface of the metal layer 17 folded to the outer peripheral side of the outer sheath 18. Accordingly, the optical cable 11 is held and fixed to the optical cable terminal fixture 30 and also, the metal layer 17 and the outer sheath 18 are pinched between the outer sheath fixing part 33 and the claws 38 of the pressing parts 37. In addition, folding work is manually done by pliers or a dedicated jig.

Figure 7:
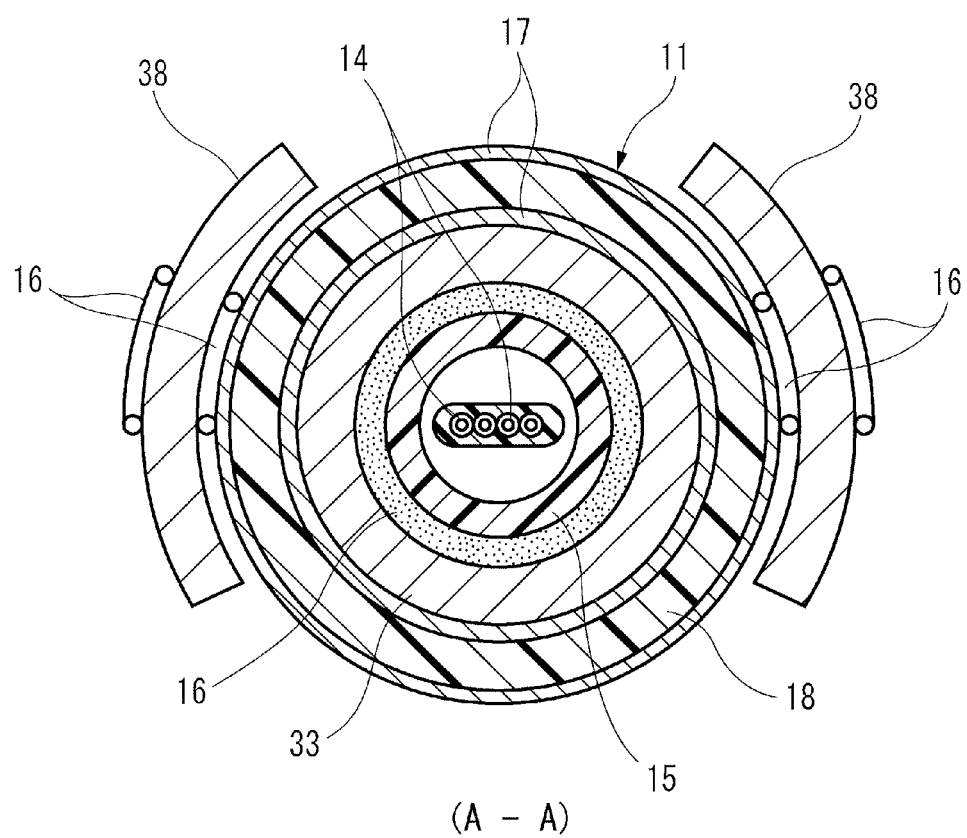
FIG. 7 is a sectional view taken on line A-A of FIG. 6.

Then, as shown by arrows in the drawing, by swaging the claws 38 to the side of the metal layer 17, the tensile strength wires 16 wound on the claws 38 are pinched between the metal layer 17 and the claws 38 as shown in FIG. 7. Accordingly, since the tensile strength wires 16 are strongly pressed to the outer sheath fixing part 33 in a state branched in plural places, a tensile force applied to the optical cable 11 can be distributed to become resistant to tension. In addition, it is unnecessary to swage the claws 38 to the side of the metal layer 17, and the claws 38 are sufficiently pressed to the upper surface of the metal layer 17 by only folding the claws 38 from the folding part 39.

Also, the metal layer 17 is interposed between the outer sheath fixing part 33 and the outer sheath 18, and is pressed to the outer sheath fixing part 33 by the lateral parts 35. Since this thermally connects the metal layer 17 to the outer sheath fixing part 33 strongly, heat can be radiated from the housing 20 joined to the outer sheath fixing part 33 to the side of the optical cable 11. Then, the heat can efficiently be conducted from the metal layer 17 to the outside through the outer sheath 18.

In addition, one example in which the end of the metal layer 17 of the optical cable 11 is folded to the outer peripheral side of the outer sheath 18 is described, but the end of the metal layer 17 can also be bonded to the basal part 32 by soldering without being folded. Accordingly, the metal layer 17 is thermally connected to the optical cable terminal fixture 30.

Further, the optical cable terminal fixture 30 is physically and thermally connected to the housing 20 by coupling the optical cable terminal fixture 30 to the back end of the housing 20. That is, the metal layer 17 of the optical cable 11 is thermally connected to the housing 20, and heat of the inside of the housing 20 can more efficiently be conducted from the optical cable terminal fixture 30 through the metal layer 17 of the optical cable 11.

Here, modified examples of the optical cable terminal fixture of the present embodiment will be described with reference to FIGS. 8A and 8B.

Figure 8A:
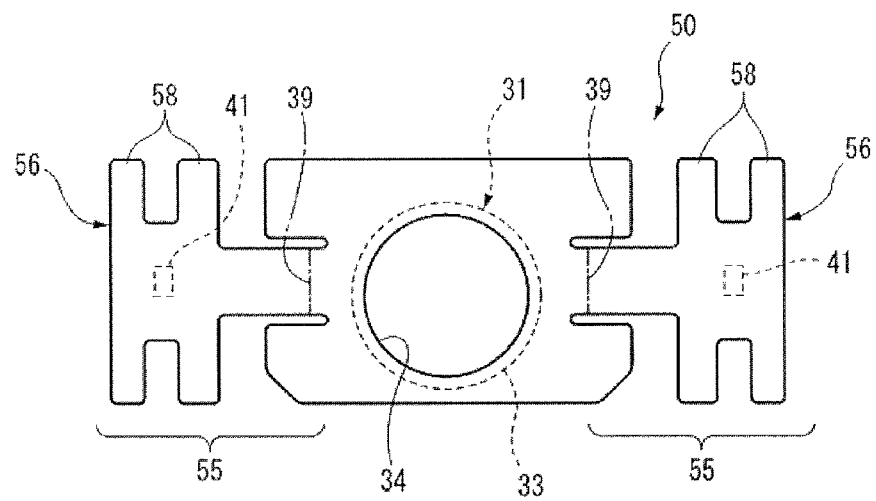
FIGS. 8A and 8B are plan views showing a modified example of an optical cable terminal fixture according to the invention.

As shown in FIG. 8A, a configuration of a wind part 56 of an optical cable terminal fixture 50 differs from that of the wind part 36 of the optical cable terminal fixture 30 described above. In the wind part 56 formed on a lateral part 55 of the optical cable terminal fixture 50, a pair of claws 58 extended in a vertical direction is juxtaposed in a transverse direction. The whole outer periphery of the metal layer 17 and the outer sheath 18 can be swaged by extending the claws 58 in the vertical direction. In addition, in a configuration of the wind part 56, the claws 58 extended in the vertical direction may be formed in one rectangular shape or may be juxtaposed in three or more lines in a transverse direction. Also, it is unnecessary for the lateral parts 55 to have a bilateral symmetrical configuration, and the configuration or the number of claws 58 may differ in the right and left.

Figure 8B:
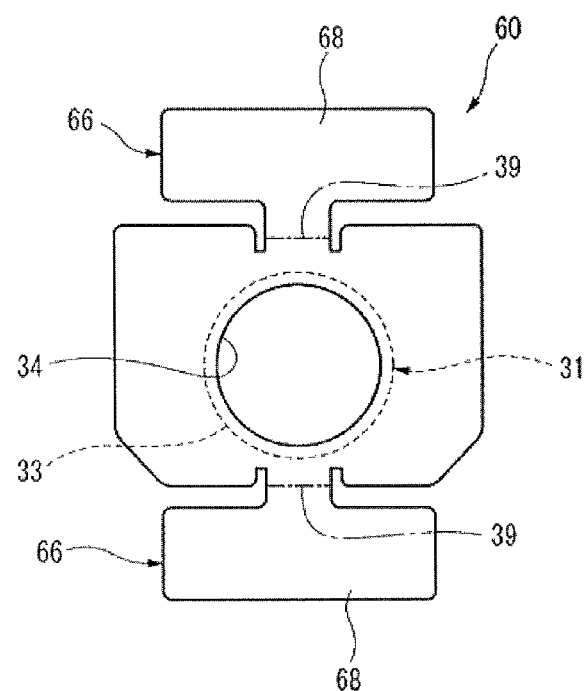

As shown in FIG. 8B, a pair of wind parts 66 of an optical cable terminal fixture 60 is arranged in a vertical direction, and a wind claw 68 has one rectangular shape extended in a transverse direction. The whole outer periphery of the metal layer 17 and the outer sheath 18 can be swaged from the vertical direction by arranging the claws 68 in the vertical direction.

As described above, a terminal fixing structure of the optical cable of the present embodiment includes the optical cable terminal fixture 30, 50, 60 including the body 31 formed in a tubular shape and having the outer sheath fixing part 33 for fixing the outer sheath 18 and the cable insertion path 34 into which the optical fibers 14 are inserted, and the lateral part 35, 55 having the wind part 36, 56, 66 on the lateral portion of the body 31 around which the tensile strength wire 16 is wound. Then, in the terminal fixing structure of the optical cable, the tensile strength wire 16 inserted into the cable insertion path 34 together with the optical fibers 14 is wound on the wind part 36, 56, 66.

The optical module 10 of the present embodiment includes the optical cable 11 which has the tensile strength wire (tensile strength fiber) 16 which is the interposed layer around the optical fibers 14 and has the outer sheath 18 on the outer periphery of the interposed layer, and the metallic housing 20 for receiving the circuit substrate 22 equipped with the photoelectric converter 21 to which the optical fibers 14 are connected. Moreover, the optical module 10 includes the optical cable terminal fixture 30, 50, 60 including the body 31 having the outer sheath fixing part 33 for fixing the outer sheath 18 and the cable insertion path 34 into which the optical fibers 14 are inserted, and the lateral part 35, 55 having the wind part 36, 56, 66 on the lateral portion of the body 31 around which the tensile strength wire (tensile strength fiber) 16 is wound. Then, in the optical module 10, the terminal of the optical cable 11A is fixed to one end of the housing 20, and the tensile strength wire 16 inserted into the cable insertion path 34 together with the optical fibers 14 is wound on the wind part 36, 56, 66.

According to the optical module 10 with such a configuration, by swaging the wind part 36, 56, 66 on which the tensile strength wire 16 is wound to the outer sheath fixing part 33, a tensile force applied to the optical module 10 through the optical cable 11 can be distributed and the optical module 10 resistant to tension can be obtained.

In addition, the lateral part 35, 55 can be folded toward the body 31, and includes the pressing part 37 for pressing the tensile strength wire 16 wound on the wind part 36, 56, 66 to the outer sheath fixing part 33. By swaging the pressing part 37 to the outer sheath fixing part 33, the tensile strength wire 16 together with the metal layer 17 and the outer sheath 18 can be pressed to the outer peripheral surface of the outer sheath fixing part 33.

In addition, the fiber pressing part 37 is provided with the pressing protrusion 41 in the direction that the lateral part 35 is folded. Since such a pressing protrusion 41 bites into the outer sheath 18 etc. at the time of pressing, the outer sheath 18 etc. can be fixed more strongly.

In addition, in the lateral parts 35, the wind parts 36 are formed on both sides of the body 31 with the body 31 sandwiched. Accordingly, a tensile force applied to the optical cable 11 can be distributed.

In addition, the wind part 36 has a pair of vertical claws 38 extended in the transverse direction, and the claws 38 can be folded toward the body 31. By this configuration, the tensile force applied to the optical cable 11 can be distributed more efficiently.

In addition, the claws 38 are formed in the positions bilaterally symmetrical with respect to the central axis of the cable insertion path 34 and accordingly, the tensile force applied to the optical cable 11 can be distributed more efficiently.

In addition, the tensile strength fibers are bundled in one piece and are sequentially wound on the plural claws 38 formed in the positions symmetrical with respect to the central axis of the cable insertion path 34 and thereby, winding work by hand can be done more efficiently.

Second Embodiment

Next, a second embodiment of the invention will be described with reference to FIGS. 9A to 13. In addition, explanation is omitted by assigning the same numerals to the same components as those of the first embodiment.

Figure 9A:
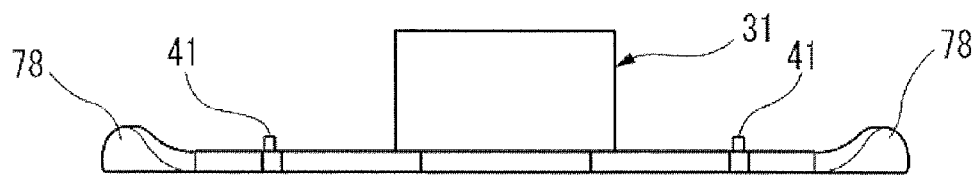
FIG. 9A is a bottom view showing another embodiment of an optical cable terminal fixture according to the invention.
Figure 9B:
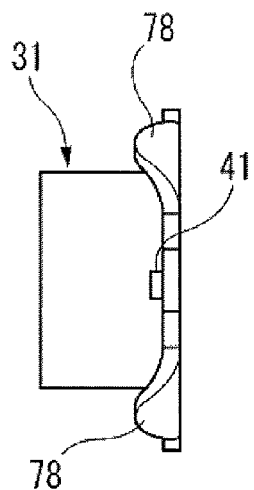
FIG. 9B is a side view showing another embodiment of an optical cable terminal fixture according to the invention.
Figure 9C:
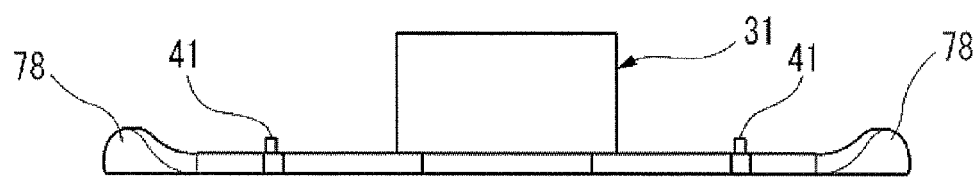
FIG. 9C is a rear view showing another embodiment of an optical cable terminal fixture according to the invention.

As shown in FIGS. 9A to 9C, a configuration of a lateral part 75 of an optical cable terminal fixture 70 differs from that of the lateral part 35 of the optical cable terminal fixture 30 described above.

The lateral parts 75 have wind parts 76 in both lateral portions of a basal part 32 (body 31). The wind parts 76 are formed bilaterally symmetrically, and are wound with a tensile strength wire 16 obtained by bundling tensile strength fibers of an optical cable 11A (see FIG. 11) in plural pieces.

The lateral part 75 can be folded toward the body 31 through a folding part 39, and has a pressing function and a step formation function. The lateral part 75 includes an outer sheath pressing part 77 formed on the side near to the basal part 32, and a step pressing part 74 formed on the far side.

The outer sheath pressing part 77 is means for pressing and fixing a part of an outer sheath 18 by pinching the part of the outer sheath 18 between an outer sheath fixing part 33 and the outer sheath pressing part 77, and is joined to the basal part 32 through the folding part 39. The outer sheath pressing part 77 has a flat plate shape, and a part of the flat plate is provided with a pressing protrusion 41 in a direction that the lateral part 75 is folded. The pressing protrusion 41 can more strongly press the outer sheath 18 to an outer peripheral surface of the outer sheath fixing part 33. Also, in the outer sheath pressing part 77, the step pressing part 74 is formed on the side opposite to the portion of joining between the outer sheath pressing part 77 and the basal part 32.

The step pressing part 74 has a flat plate shape with substantially a triangle, and a claw 78 projecting in the direction that the lateral part 75 is folded is formed on the top of the step pressing part 74. In this embodiment, a total of four claws 78 are formed on the right and left lateral parts 75 in one vertical pair, respectively, and the outer sheath 18 is pressed by these plural locking claws 78. The step pressing part 74 presses and fixes the outer sheath 18 by pressing the outer sheath 18 to the center direction of the optical cable 11A so as to form a step part between a part of the outer sheath 18 fixed by the outer sheath pressing part 77 and another part of the outer sheath 18.

The wind part 76 includes the plural (a pair of vertical parts extended in a vertical direction in the present embodiment) step pressing parts 74, and three wind recesses 36a, 36b, 36c adjacent to the step pressing part 74. The tensile strength wire 16 exposed from the optical cable 11A and bundled in plural pieces is wound on this wind part 76. Accordingly, a tensile force applied to the optical cable 11A can be distributed more efficiently. Also, since the locking claws 78 of the step pressing part 74 project, the wound tensile strength wire 16 is resistant to coming out of the wind part 76 and in the number of turns of the tensile strength wire 16 wound on the wind part 76, only one turn will suffice.

Figure 10A:
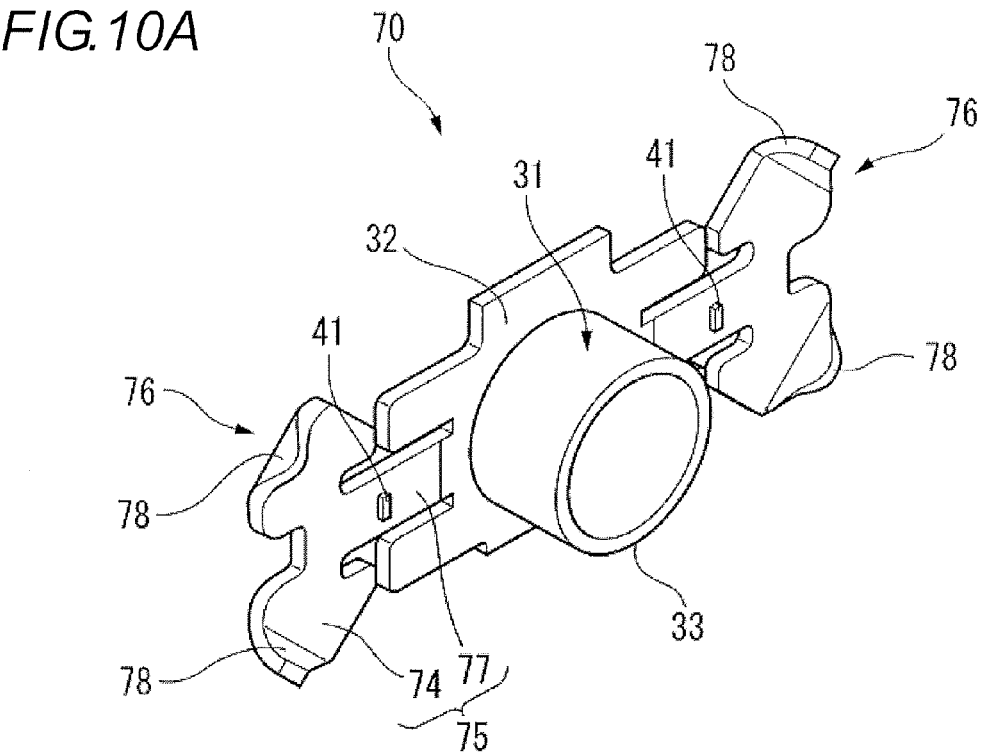
FIG. 10A is a perspective view of the optical cable terminal fixture shown in FIGS. 9A to 9C.
Figure 10B:
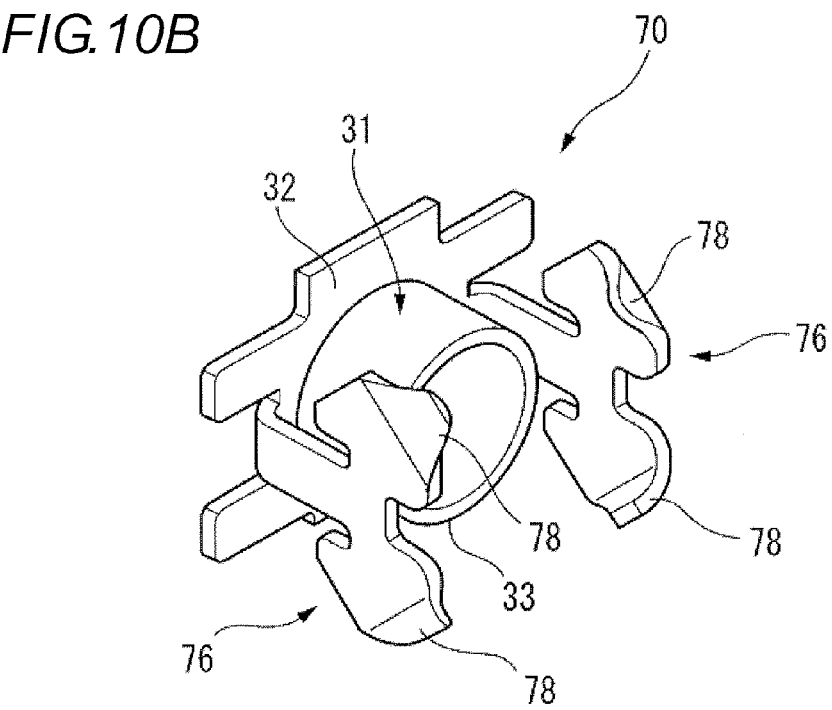
FIG. 10B is a perspective view showing a state of swaging the optical cable terminal fixture shown in FIG. 10A.

Also, as shown in FIGS. 10A and 10B, the optical cable terminal fixture 70 is formed so that the length (length ranging from the basal part 32 to the top of the locking claw 78) of the lateral part 75 differs from the length (length of the portion projecting from the basal part 32) of the body 31 when the lateral part 75 is folded toward the body 31. The length of the body 31 is formed shorter than the length of the lateral part 75 and in the case of swaging the optical cable terminal fixture 70, the outer sheath pressing part 77 is pressed to the body 31 (outer sheath fixing part 33), but the body 31 is not formed in a position opposed to the step pressing part 74, so that the step pressing part 74 can be swaged to the center direction of the optical cable 11A beyond the outer sheath pressing part 77.

Figure 11:
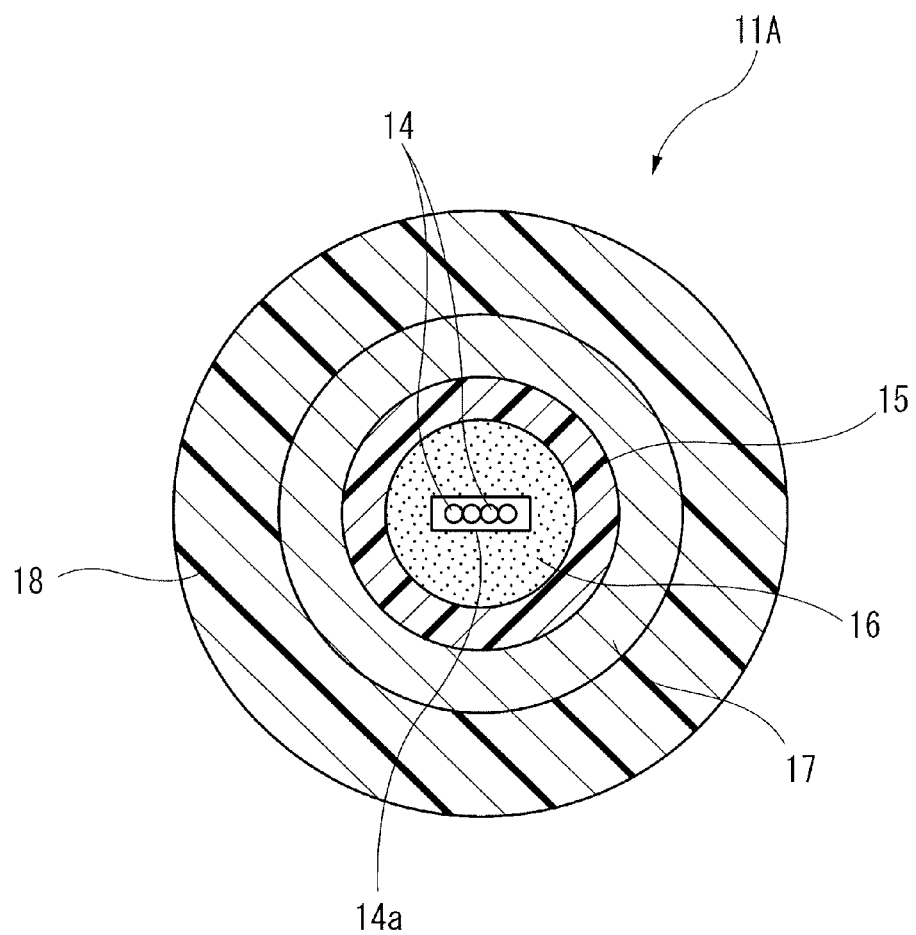
FIG. 11 is a sectional view of an optical cable of another embodiment.

The optical cable 11A fixed by the optical cable terminal fixture 70 includes an optical fiber tape 14a, the tensile strength wire (interposed layer) 16, a cylindrical inner tube 15 for receiving the optical fiber tape 14a and the tensile strength wire 16, a metal layer 17 formed on the periphery of the inner tube 15, and the outer sheath 18 formed on the outer periphery of the metal layer 17 as shown in FIG. 11.

The optical cable 11A has the optical fiber tape 14a in which plural optical fibers 14 are juxtaposed in a plane and are integrated in a tape shape by a coated resin in the center of a transverse cross section. The tensile strength wire 16 is arranged along the optical fiber tape 14a in a gap between the optical fiber tape 14a and an inner surface of the inner tube 15. An outside diameter of the inner tube 15 is preferably, for example, 4.0 mm or less in order to decrease the diameter of optical cable 11A. In addition, a thickness of the inner tube 15 is preferably, for example, 0.3 mm or more in order to prevent a break due to a shock from the outside.

In addition, the optical cable 11A of the second embodiment differs from that of the first embodiment in that the tensile strength wire 16 is arranged along the optical fiber tape 14a in the gap between the optical fiber tape 14a and the inner surface of the inner tube 15. However, the optical cable 11A of the second embodiment can be used in the first embodiment and also, the optical cable 11 of the first embodiment can be used in the second embodiment. That is, in combinations of the optical cable and the optical cable terminal fixture, the optical cable 11A may be attached to the optical cable terminal fixture 30, 50, 60, or the optical cable 11 may be attached to the optical cable terminal fixture 70.

Figure 12:
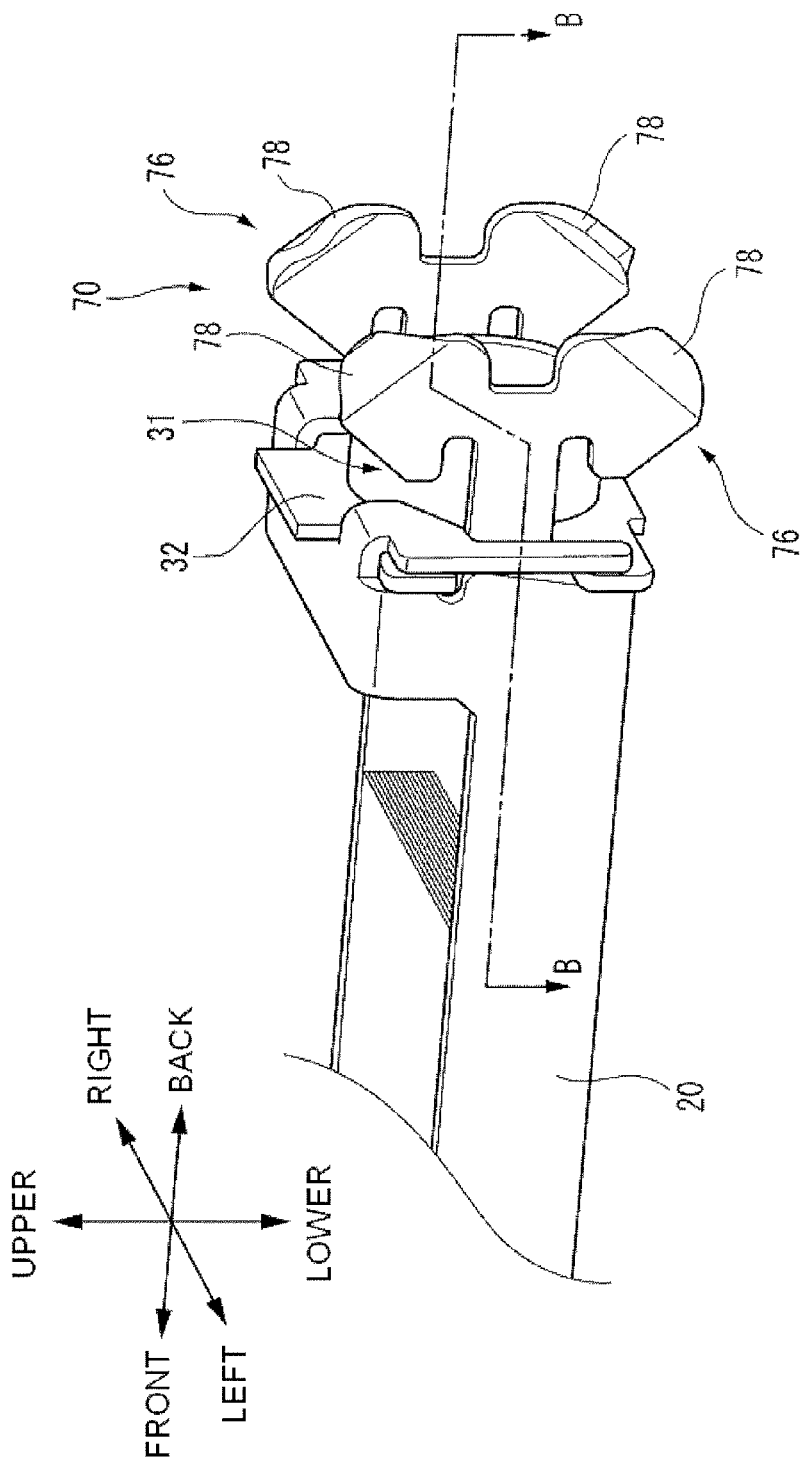
FIG. 12 is a perspective view of the optical cable terminal fixture shown in FIGS. 9A to 9C joined to a housing of an optical module.
Figure 13:
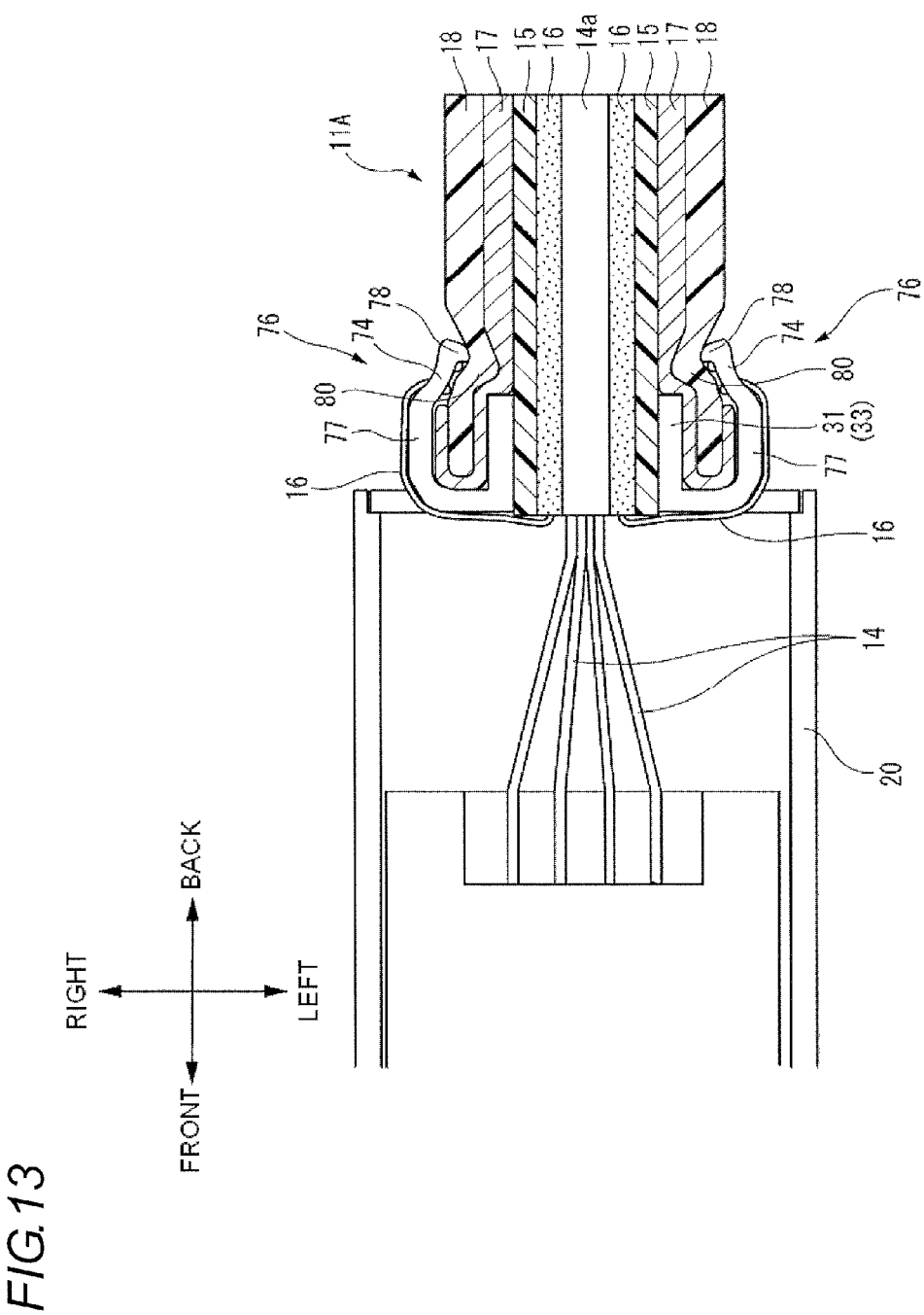
FIG. 13 is a sectional view taken on line B-B in the case of attaching the optical cable shown in FIG. 11 to the optical cable terminal fixture of FIG. 12.

FIG. 12 shows the optical cable terminal fixture 70 joined to a housing 20 of an optical module 10, and FIG. 13 shows a sectional view taken on line B-B in the case of attaching the optical cable 11A to the optical cable terminal fixture 70 shown in FIG. 12 and swaging the optical cable terminal fixture 70.

As shown in FIG. 13, the lateral part 75 pinches the outer sheath 18 between the outer sheath pressing part 77 and the outer sheath fixing part 33 of the body 31. Since the outer sheath fixing part 33 is not formed in a position opposed to the step pressing part 74, in the case of being swaged, the step pressing part 74 is pressed to the center direction of the optical cable 11A and is folded, and a step part 80 is formed between the portion of the outer sheath 18 fixed by the outer sheath pressing part 77 and the portion of the outer sheath 18 fixed by the step pressing part 74. The outer sheath 18 is subjected to a pressing force of decreasing a diameter from the outer sheath pressing part 77 to the inside and also is subjected to a pressing force pressed from the step pressing part 74 and the locking claw 78 to the center and is strongly fixed. In addition, it is unnecessary to swage the step pressing part 74 to the center direction of the optical cable 11A stronger than the outer sheath pressing part 77. That is, only by folding the outer sheath pressing part 77 from the folding part 39, the step pressing part 74 can press and fix the outer sheath 18 by pressing the outer sheath 18 to the center direction of the optical cable 11A so as to form the step part between a part of the outer sheath 18 fixed by the outer sheath pressing part 77 and another part of the outer sheath 18 by means of the locking claws 78 formed on the top of the step pressing part 74.

Also, the tensile strength wire 16, which is inserted into a cable insertion path 34 and is pulled out of the front side of the basal part 32 and is wound on the wind part 76, is pressed by being pressed to the center direction of the optical cable 11A by the step pressing part 74 and is pinched between the outer sheath 18 and the wind part 76.

The metal layer 17 exposed by peeling the outer sheath 18 of the optical cable 11A is folded to the outer peripheral side of the outer sheath 18 and also, the outer periphery of the outer sheath fixing part 33 is covered with the metal layer 17. The metal layer 17 is interposed between the outer sheath fixing part 33 and the outer sheath 18 and on the outer peripheral side of the outer sheath 18, and is pressed to the outer peripheral surface of the outer sheath fixing part 33 by the outer sheath pressing part 77 of the lateral part 75. Accordingly, the optical cable 11A is held and fixed to the optical cable terminal fixture 70, and the metal layer 17 and the outer sheath 18 are pinched between the outer sheath pressing part 77 and the outer peripheral surface of the outer sheath fixing part 33.

As described above, a terminal fixing structure of the optical cable of the present embodiment includes the optical cable terminal fixture 70 including the body 31 formed in a tubular shape and having the outer sheath fixing part 33 for fixing the outer sheath 18 and the cable insertion path 34 into which the optical fibers 14 are inserted, and the lateral part 75 having the wind part 76 on the lateral portion of the body 31 around which the tensile strength wire 16 is wound. In addition, the terminal fixing structure of the optical cable of the present embodiment includes the optical cable 11A. Then, the step pressing part 74 is formed on the lateral part 75 of the optical cable terminal fixture 70, and the step pressing part 74 presses the outer sheath 18 to the center direction of the optical cable 11A so as to form the step part 80 between a part of the outer sheath 18 fixed by the outer sheath pressing part 77 and another part of the outer sheath 18.

By this configuration, the outer sheath 18 is strongly pressed to the outer sheath fixing part 33, and a fixing force of the optical cable 11A to a tensile force on the optical cable 11A is increased. In other words, since the step part 80 is formed in the outer sheath 18, the tensile force on the optical cable 11A catches on the step part, and the optical cable 11A becomes resistant to coming out of the optical cable terminal fixture 70. In addition, a tensile force applied to the optical module 10 through the optical cable 11A can be distributed by swaging the wind part 76 on which the tensile strength wire 16 is wound to the outer sheath fixing part 33 like the first embodiment.

In addition, according to the optical cable terminal fixture 70, since the tensile strength wire 16 wound on the wind part 76 is pressed by being pressed to the center direction of the optical cable 11A by the step pressing part 74 and is pinched between the outer sheath 18 and the wind part 76, the fixing force of the optical cable 11A to the tensile force on the optical cable 11A is more increased.

In addition, according to the optical cable terminal fixture 70, since the locking claw 78 is projected and formed, at the time of swaging, the locking claw 78 bites into the outer sheath 18 to be locked and the fixing force of the optical cable 11A is more increased. In addition, since the locking claw 78 is projected, the tensile strength wire 16 wound on the wind part 76 is resistant to coming loose and before a swaging step, the number of turns of the tensile strength wire 16 can be decreased and work efficiency can be improved. In addition, after the swaging step, the wind part 76 on which the tensile strength wire 16 is wound is swaged to the outer sheath 18 and is pressed to the outer sheath 18 and thereby, the optical cable 11A can be made resistant to coming out of the optical cable terminal fixture 70 even for a small number of turns. In addition, since the number of turns decreases, the boot 19 can be miniaturized.

In addition, according to the optical cable terminal fixture 70, since the pressing protrusion 41 is formed in the direction that the lateral part 75 is folded, the pressing protrusion 41 bites into the outer sheath 18 etc. at the time of pressing, so that the outer sheath 18 etc. can be fixed more strongly.

In addition, according to the optical cable terminal fixture 70, since the four locking claws 78 are formed and the outer sheath 18 is pressed by the plural locking claws 78, the outer sheath 18 etc. can be fixed more strongly.

In addition, the optical module 10 of the present embodiment includes the optical cable 11A which has the tensile strength wire (tensile strength fiber) 16 which is the interposed layer around the optical fibers 14 and has the outer sheath 18 on the outer periphery of the interposed layer, and the metallic housing 20 for receiving a circuit substrate 22 equipped with a photoelectric converter 21 to which the optical fibers 14 are connected. Moreover, the optical module 10 includes the optical cable terminal fixture 70 described above. Then, in the optical module 10, the terminal of the optical cable 11A is fixed to one end of the housing 20, and the tensile strength wire 16 inserted into the cable insertion path 34 together with the optical fibers 14 is wound on the wind part 76.

According to the optical module 10 with such a configuration, a fixing force of the optical cable 11A to a tensile force on the optical cable 11A can be increased by swaging the wind part 76 on which the tensile strength wire 16 is wound to the outer sheath 18.

In addition, the lateral part 75 can be folded toward the body 31, and includes the step pressing part 74 for pressing the tensile strength wire 16 wound on the wind part 76 to the outer sheath 18, and the optical cable 11A has the metal layer 17 between the tensile strength wire 16 and the outer sheath 18. Then, the metal layer 17 is interposed between the outer sheath fixing part 33 and the outer sheath 18, and is pressed to the outer sheath fixing part 33 by the lateral part 75. This thermally connects the metal layer 17 to the outer sheath fixing part 33 strongly. In addition, the optical cable terminal fixture 70 is fixed to the housing 20. Consequently, heat of the inside of the housing 20 can be lost to the side of the optical cable 11A through the optical cable terminal fixture 70. Then, the heat can efficiently be conducted from the metal layer 17 to the outside through the outer sheath 18.

In addition, since the outer sheath 18 and the metal layer 17 formed by braiding tin-plated conductive wires are pinched between the outer sheath pressing part 77 and the outer peripheral surface of the outer sheath fixing part 33, the metal layer 17 bites into the outer sheath 18 and by its frictional force, the outer sheath 18 can be made resistant to coming out of the optical cable terminal fixture 70.

According to the configuration of the present embodiment as described above, the action and effect described above can be obtained in addition to the action and effect of the first embodiment. In addition, the optical cable terminal fixture, the terminal fixing structure of the optical cable and the optical module of the invention are not limited to the embodiments described above, and modifications, improvements, etc. can properly be made freely.

The invention has been described in detail with reference to the specific embodiments, but it is apparent to those skilled in the art that various changes or modifications can be made without departing from the spirit and scope of the invention.

The present application is based on Japanese patent application (patent application No. 2011-287081) filed on Dec. 28, 2011, and Japanese patent application (patent application No. 2012-197710) filed on Sep. 7, 2012, and the contents of the patent applications are hereby incorporated by reference.

The invention claimed is:

1. An optical cable terminal fixture for fixing a terminal of an optical cable having a tensile strength fiber around an optical fiber and having an outer sheath on an outer periphery of the tensile strength fiber comprising:

a body formed in a tubular shape having an outer sheath fixing part for fixing the outer sheath, and a cable insertion path into which the optical fiber is inserted; and a lateral part having a wind part on a lateral portion of the body around which the tensile strength fiber is wound, wherein the lateral part can be folded toward the outer sheath fixing part, and wherein the lateral part comprises:

an outer sheath pressing part for fixing a part of the outer sheath between the outer sheath fixing part and the outer sheath pressing part; and a step pressing part for fixing the outer sheath by pressing the outer sheath to a center direction of the optical cable so as to form a step part on the outer sheath.

2. The optical cable terminal fixture according to claim 1, wherein a claw projecting in a direction that the lateral part is folded is formed on the step pressing part so as to form the step part.

3. The optical cable terminal fixture according to claim 1, wherein the outer sheath pressing part is provided with a pressing protrusion in a direction that the lateral part is folded.

4. An optical cable terminal fixture for fixing a terminal of an optical cable having a tensile strength fiber around an optical fiber and having an outer sheath on an outer periphery of the tensile strength fiber comprising:

a body formed in a tubular shape having an outer sheath fixing part for fixing the outer sheath, and a cable insertion path into which the optical fiber is inserted; and a lateral part having a wind part on a lateral portion of the body around which the tensile strength fiber is wound, wherein the lateral part can be folded toward the outer sheath fixing part, and wherein the lateral part comprises a pressing part for pressing the tensile strength fiber wound around the wind part to the outer sheath fixing part.

5. The optical cable terminal fixture according to claim 4, wherein the pressing part is provided with a pressing protrusion in a direction that the lateral part is folded.

6. The optical cable terminal fixture according to claim 4, wherein the wind part has plural claws, and the claws are formed to be foldable toward the body.

7. The optical cable terminal fixture according to claim 6, wherein the claws are formed in positions symmetrical with respect to a central axis of the cable insertion path.

8. An optical cable terminal fixing structure comprising:

an optical cable including an optical fiber, a tensile strength fiber around the optical fiber, and having an outer sheath on an outer periphery of the tensile strength fiber;

a body formed in a tubular shape having an outer sheath fixing part for fixing the outer sheath and a cable insertion path into which the optical fiber is inserted; and a lateral part having a wind part on a lateral portion of the body around which the tensile strength fiber is wound, wherein the tensile strength fiber is inserted into the cable insertion path together with the optical fiber, wherein the tensile strength fiber is wound around the wind part, wherein the lateral part is folded toward the outer sheath fixing part, and wherein the lateral part comprises:

an outer sheath pressing part for fixing a part of the outer sheath between the outer sheath fixing part and the outer sheath pressing part; and a step pressing part for fixing the outer sheath by pressing the outer sheath to a center direction of the optical cable so as to form a step part on the outer sheath.

9. The optical cable terminal fixing structure according to claim 8, wherein the outer sheath is pressed in plural places.

10. An optical cable terminal fixing structure comprising:

an optical cable including an optical fiber, a tensile strength fiber around the optical fiber, and having an outer sheath on an outer periphery of the tensile strength fiber;

a body formed in a tubular shape having an outer sheath fixing part for fixing the outer sheath and a cable insertion path into which the optical fiber is inserted; and a lateral part having a wind part on a lateral portion of the body around which the tensile strength fiber is wound, wherein the tensile strength fiber is inserted into the cable insertion path together with the optical fiber, wherein the tensile strength fiber is wound around the wind part, wherein the lateral part is folded toward the outer sheath fixing part, wherein the lateral part further comprises plural claws formed in positions symmetrical with respect to a central axis of the cable insertion path, and wherein the tensile strength fiber is wound on the plural claws.

11. The optical cable terminal fixing structure according to claim 10, wherein the tensile strength fiber is bundled and is sequentially wound on the plural claws.

12. An optical module comprising:

an optical cable including an optical fiber, a tensile strength fiber around the optical fiber, and an outer sheath on an outer periphery of the tensile strength fiber;

a circuit substrate on which a photoelectric converter is mounted and the optical fiber is connected to the photoelectric converter;

a housing for receiving the circuit substrate; and an optical cable terminal fixture including a body formed in a tubular shape having an outer sheath fixing part for fixing the outer sheath and a cable insertion path into which the optical fiber is inserted, and a lateral part having a wind part on a lateral portion of the body around which the tensile strength fiber is wound, wherein a terminal of the optical cable is fixed to one end of the housing, wherein the tensile strength fiber is inserted into the cable insertion path together with the optical fiber, wherein the tensile strength fiber is wound around the wind part, wherein the lateral part is folded toward the outer sheath fixing part, wherein the lateral part comprises:

an outer sheath pressing part formed on the lateral part fixes a part of the outer sheath between the outer sheath fixing part and the outer sheath pressing part; and a step pressing part formed on the lateral part fixes the outer sheath by pressing the outer sheath to a center direction of the optical cable so as to form a step part on the outer sheath, wherein the optical cable includes a metal layer between the tensile strength fiber and the outer sheath, and wherein the metal layer is interposed between the outer sheath fixing part and the outer sheath and is pressed to the outer sheath fixing part by the lateral part.

* * * * *